United States Patent
Liu

(10) Patent No.: US 10,965,408 B2
(45) Date of Patent: Mar. 30, 2021

(54) METHOD, NETWORK DEVICE, AND TERMINAL DEVICE FOR TRANSMITTING INFORMATION

(71) Applicant: HUAWEI TECHNOLOGIES CO., LTD., Guangdong (CN)

(72) Inventor: Qi Liu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/400,115

(22) Filed: May 1, 2019

(65) Prior Publication Data

US 2019/0260517 A1    Aug. 22, 2019

Related U.S. Application Data

(63) Continuation of application No. PCT/CN2016/104501, filed on Nov. 4, 2016.

(51) Int. Cl.
     *H04W 72/12*      (2009.01)
     *H04L 1/18*      (2006.01)
     *H04L 1/16*      (2006.01)

(52) U.S. Cl.
CPC .......... *H04L 1/1854* (2013.01); *H04L 1/1621* (2013.01); *H04L 1/1812* (2013.01); *H04L 1/1822* (2013.01); *H04L 1/1893* (2013.01); *H04W 72/1247* (2013.01); *H04W 72/1289* (2013.01)

(58) Field of Classification Search
CPC ........................................................ H04L 12/50
USPC ........................................................ 370/329
See application file for complete search history.

(56) References Cited

U.S. PATENT DOCUMENTS

| | | | |
|---|---|---|---|
| 2016/0337089 | A1 | 11/2016 | Chen et al. |
| 2017/0041234 | A1 | 2/2017 | Lin et al. |
| 2017/0142715 | A1 | 5/2017 | Li et al. |
| 2020/0059327 | A1* | 2/2020 | Kini ................ H04L 1/1864 |

FOREIGN PATENT DOCUMENTS

| | | |
|---|---|---|
| CN | 101119184 A | 2/2008 |
| CN | 103378957 A | 10/2013 |
| CN | 103384393 A | 11/2013 |
| CN | 103546411 A | 1/2014 |
| CN | 104080161 A | 10/2014 |
| CN | 104348597 A | 2/2015 |
| CN | 104770030 A | 7/2015 |
| CN | 105210332 A | 12/2015 |

(Continued)

OTHER PUBLICATIONS

A translation of CN 103378957, Beijing Samsung, Sep. 2013, 47 pages.*

(Continued)

*Primary Examiner* — Dang T Ton
(74) *Attorney, Agent, or Firm* — Fish & Richardson P.C.

(57) ABSTRACT

Example methods and apparatus for transmitting information are described. One example method includes determining a first hybrid automatic repeat request (HARQ) timing corresponding to a first service of a terminal device by a network device from a plurality of HARQ timings. Indication information is sent by the network device to the terminal device, where the indication information is used to indicate the first HARQ timing.

16 Claims, 7 Drawing Sheets

(56) References Cited

FOREIGN PATENT DOCUMENTS

WO         2014157979 A1    10/2014
WO         2015103722 A1     7/2015

OTHER PUBLICATIONS

A translation of CN 104080161, ZTE, Oct. 1, 2014, 27 pages.*
Extended European Search Report issued in European Application No. 16920757.8 dated Aug. 23, 2019, 6 pages.
R1-1608839—Huawei et al., "Discussion on timing relations for NR," 3GPP TSG RAN WG1 Meeting #86bis, Lisbon, Portugal, XP051148893, Oct. 10-14, 2016, 6 pages.
Office Action issued in Chinese Application No. 201680089785.1 dated Mar. 3, 2020, 9 pages.
Intel Corporation, NR HARQ and scheduling timing. 3GPP TSG-RAN WG1 #86bis Lisbon, Portugal Oct. 10-14, 2016, R1-1609542, 3 pages.
International Search Report and Written Opinion issued in International Application No. PCT/CN2016/104501 dated Aug. 1, 2017, 18 pages.
Catt, "NR HARQ operation," 3GPP TSG RAN WG1 Meeting #86bis, R1-1608796, Lisbon, Portugal, Oct. 10-14, 2016, 3 pages.
Intel Corporation, "UCI and DL HARQ-ACK feedback for NB-IoT," 3GPP TSG RAN WG1 NB-IoT Ad-Hoc Meeting #2, R1-161902, Sophia Antipolis, France, Mar. 22-24, 2016, 7 pages.
Office Action issued in Korean Application No. 2019-7014033 dated May 27, 2020, 9 pages (with English translated).

\* cited by examiner

METHOD, NETWORK DEVICE, AND TERMINAL DEVICE FOR TRANSMITTING INFORMATION

CROSS-REFERENCE TO RELATED APPLICATIONS

This application is a continuation of International Application No. PCT/CN2016/104501, filed on Nov. 4, 2016, the disclosure of which is hereby incorporated by reference in its entirety.

TECHNICAL FIELD

Embodiments of the present invention relate to the communications field, and more specifically, to a method, network device, and terminal device for transmitting information.

BACKGROUND

Hybrid automatic repeat request (HARQ) is a technology in which forward error correction (FEC) coding is combined with an automatic repeat request (ARQ) method. FEC may be used to correct a data error in a transmission process. To be specific, if an error falls within an error correction range of the FEC, the FEC is used to perform error correction. If an error falls beyond the error correction range of the FEC, retransmission needs to be requested.

In a 3G/4G communications system, the HARQ technology is used for air-interface uplink and downlink data transmission. FIG. 1 schematically shows a HARQ feedback in uplink and downlink data transmission. As shown in FIG. 1, a transmit end sends data at a moment to, and a receive end detects the received data. The receive end feeds back an acknowledgment (ACK)/a negative acknowledgment (NACK) to the transmit end at a moment $t_1$, and the transmit end receives feedback information. If the transmit end receives NACK information, the transmit end retransmits a data packet at a moment $t_2$. A timing (timing) relationship between the moment to and the moment $t_1$ is referred to as a HARQ timing.

The International Telecommunication Union (ITU) defines three types of services in expectations and requirements of 5G: an enhanced mobile broadband (eMBB) service, an ultra-reliable and low/latency machine type communication (uMTC) service, and a massive machine type communication (mMTC) service. Because a QoS requirement of each service is different, each service requires a different HARQ timing.

However, in an existing HARQ solution, when a terminal device has a plurality of different services, only a same HARQ timing can be used, and consequently quality of service (QoS) requirements of the services cannot be met.

SUMMARY

Embodiments of the present invention provide a method, network device, and terminal device for transmitting information, to improve QoS of a service.

According to a first aspect, an information transmission method is provided. The method includes: determining, by a network device from a plurality of hybrid automatic repeat request HARQ timings, a first HARQ timing corresponding to a first service of a terminal device; and sending, by the network device, indication information to the terminal device, where the indication information is used to indicate the first HARQ timing.

In this embodiment of the present invention, the network device can notify, by using the indication information, the terminal device of the first HARQ timing corresponding to the first service, so that when the network device uses a plurality of services, different HARQ timings can be used for different services, to improve QoS of a service.

In a possible design, the sending, by the network device, indication information to the terminal device includes: sending, by the network device, first downlink control information DCI corresponding to the first service to the terminal device, where a type of the first DCI is used to indicate the first HARQ timing, or a specific information bit in the first DCI is used to indicate the first HARQ timing, or an air interface resource location that carries the first DCI is used to indicate the first HARQ timing, or a first radio network temporary identifier RNTI for scrambling the first DCI is used to indicate the first HARQ timing.

In a possible design, before the determining, by a network device from a plurality of hybrid automatic repeat request HARQ timings, a first HARQ timing corresponding to a first service of a terminal device, the method further includes: sending, by the network device, information about a mapping relationship between a HARQ timing and a resource to the terminal device, where the mapping relationship information includes the plurality of HARQ timings and a resource corresponding to each of the plurality of HARQ timings.

In a possible design, the first HARQ timing is a first downlink HARQ timing, and the method further includes: determining, by the network device based on the first downlink HARQ timing and the mapping relationship information, a first resource corresponding to the first downlink HARQ timing; and receiving, by the network device on the first resource based on the first downlink HARQ timing, first downlink HARQ feedback information that is sent by the terminal device and that is corresponding to the first service.

In this embodiment of the present invention, the network device can receive the first downlink HARQ feedback information on the first resource corresponding to the first downlink HARQ timing, to distinguish a downlink HARQ timing corresponding to each piece of downlink HARQ feedback information, thereby improving QoS of a service.

In a possible design, the first HARQ timing is a first uplink HARQ timing, and the method further includes: determining, by the network device based on the first uplink HARQ timing and the mapping relationship information, a first resource corresponding to the first uplink HARQ timing; and sending, by the network device on the first resource based on the first uplink HARQ timing, first uplink HARQ feedback information corresponding to the first service to the terminal device.

In a possible design, the first resource includes at least one of a resource block RB location, a quantity of RBs, code word information, and a sequence number.

In a possible design, the mapping relationship information includes the following correspondences: a plurality of downlink HARQ timings and a physical uplink control channel PUCCH resource corresponding to each of the plurality of downlink HARQ timings, a plurality of downlink HARQ timings and a physical uplink shared channel PUSCH resource corresponding to each of the plurality of downlink HARQ timings, and a plurality of uplink HARQ timings and a physical hybrid automatic repeat request indicator channel PHICH resource corresponding to each of the plurality of uplink HARQ timings.

In some possible designs, the sending, by the network device, information about a mapping relationship between a HARQ timing and a resource to the terminal device includes: sending, by the network device, L3 signaling to the terminal device, where the L3 signaling carries the mapping relationship information.

According to a second aspect, a network device is provided, and the network device includes modules for performing the foregoing network device-based information transmission method. Based on a same inventive concept, a problem-resolving principle of the network device is corresponding to the solution of the method design in the foregoing aspect. Therefore, for implementation of the network device, refer to the implementation of the method. No repeated description is provided.

According to a third aspect, a network device is provided, and the network device includes a transceiver, a memory, and a processor. The transceiver, the memory, and the processor are connected by using a system bus, the memory is configured to store an instruction, the processor is configured to execute the instruction stored in the memory, and when the program is executed, the processor is configured to perform the foregoing network device-based information transmission method.

According to a fourth aspect, an information transmission method is provided. The method includes: receiving, by a terminal device, indication information sent by a network device, where the indication information is used to indicate a first HARQ timing corresponding to a first service of the terminal device in a plurality of hybrid automatic repeat request HARQ timings; and receiving or sending, by the terminal device based on the first HARQ timing, HARQ feedback information corresponding to the first service.

In this embodiment of the present invention, the terminal device can determine, by using the indication information sent by the network device, the first HARQ timing corresponding to the first service, so that when the terminal device uses a plurality of services, different HARQ timings can be used for different services, to improve QoS of a service.

In a possible design, the receiving, by a terminal device, indication information sent by a network device includes: receiving, by the terminal device, first downlink control information DCI that is sent by the network device and that is corresponding to the first service, where a type of the first DCI is used to indicate the first HARQ timing, or a specific information bit in the first DCI is used to indicate the first HARQ timing, or an air interface resource location that carries the first DCI is used to indicate the first HARQ timing, or a first radio network temporary identifier RNTI for scrambling the first DCI is used to indicate the first HARQ timing.

In a possible design, before the receiving, by a terminal device, indication information sent by a network device, the method further includes: receiving, by the terminal device, information that is about a mapping relationship between a HARQ timing and a resource and that is sent by the network device, where the mapping relationship information includes the plurality of HARQ timings and a resource corresponding to each of the plurality of HARQ timings.

In a possible design, the first HARQ timing is a first downlink HARQ timing, and the receiving or sending, by the terminal device based on the first HARQ timing, HARQ feedback information corresponding to the first service includes: determining, by the terminal device based on the first downlink HARQ timing and the mapping relationship information, a first resource corresponding to the first downlink HARQ timing; and sending, by the terminal device on the first resource based on the first downlink HARQ timing, first downlink HARQ feedback information corresponding to the first service to the network device.

In a possible design, the first HARQ timing is a first uplink HARQ timing, and the receiving or sending, by the terminal device based on the first HARQ timing, HARQ feedback information corresponding to the first service includes: determining, by the terminal device based on the first uplink HARQ timing and the mapping relationship information, a first resource corresponding to the first uplink HARQ timing; and receiving, by the terminal device on the first resource based on the first uplink HARQ timing, first uplink HARQ feedback information that is sent by the network device and that is corresponding to the first service.

In this embodiment of the present invention, the terminal device can receive the first uplink HARQ feedback information on the first resource corresponding to the first uplink HARQ timing, to distinguish an uplink HARQ timing corresponding to each piece of uplink HARQ feedback information, thereby improving QoS of a service.

In a possible design, the first resource includes at least one of a resource block RB location, a quantity of RBs, code word information, and a sequence number.

In a possible design, the mapping relationship information includes the following correspondences: a plurality of downlink HARQ timings and a physical uplink control channel PUCCH resource corresponding to each of the plurality of downlink HARQ timings, a plurality of downlink HARQ timings and a physical uplink shared channel PUSCH resource corresponding to each of the plurality of downlink HARQ timings, and a plurality of uplink HARQ timings and a physical hybrid automatic repeat request indicator channel PHICH resource corresponding to each of the plurality of uplink HARQ timings.

In some possible designs, the receiving, by the terminal device, information that is about a mapping relationship between a HARQ timing and a resource and that is sent by the network device includes: sending, by the network device, L3 signaling to the terminal device, where the L3 signaling carries the mapping relationship information.

According to a fifth aspect, a terminal device is provided, and the terminal device includes modules for performing the terminal device-based information transmission method in the fourth aspect. Based on a same inventive concept, a problem-resolving principle of the terminal device is corresponding to the solution of the method design in the fourth aspect. Therefore, for implementation of the terminal device, refer to the implementation of the method. No repeated description is provided.

According to a sixth aspect, a terminal device is provided, and the terminal device includes a transceiver, a memory, and a processor. The transceiver, the memory, and the processor are connected by using a system bus, the memory is configured to store an instruction, the processor is configured to execute the instruction stored in the memory, and when the program is executed, the processor is configured to perform the terminal device-based information transmission method in the fourth aspect.

According to a seventh aspect, an information transmission method is provided. The method includes: determining, by a terminal device from a plurality of uplink grant UL_grant timings, a first UL_grant timing corresponding to a first uplink service of the terminal device; and sending, by the terminal device, first indication information to a network device, where the first indication information is used to indicate the first UL_grant timing.

In this embodiment of the present invention, the terminal device can determine, by using the first indication information sent by the network device, the first UL_grant timing corresponding to the first uplink service, so that when the terminal device uses a plurality of services, different UL_grant timings can be used for different services, to improve QoS of a service.

In a possible design, the sending, by the terminal device, first indication information to a network device includes: sending, by the terminal device, a first uplink scheduling request SR corresponding to the first uplink service and/or first buffer status information BSR corresponding to the first uplink service to the network device, where a type of the first SR and/or a type of the first BSR are/is used to indicate the first UL_grant timing, or an air interface resource location that carries the first SR and/or the first BSR is used to indicate the first UL_grant timing.

In a possible design, the method further includes: receiving, by the terminal device, second indication information sent by the network device, where the second indication information is used to indicate a first transmission timing corresponding to the first uplink service in a plurality of transmission timings; and sending, by the terminal device, the first uplink service to the network device based on the first transmission timing.

In this embodiment of the present invention, the terminal device can determine, by using the second indication information sent by the network device, the first transmission timing corresponding to the first uplink service, so that when the terminal device uses a plurality of services, different first transmission timings can be used for different services, to improve QoS of a service.

In a possible design, the receiving, by the terminal device, second indication information sent by the network device includes: receiving, by the terminal device, first downlink control information DCI sent by the network device, where the first DCI includes first UL_grant information, and format information of the first DCI is used to indicate the first transmission timing, or a specific information bit in the first DCI is used to indicate the first transmission timing, or an air interface resource location that carries the first DCI is used to indicate the first transmission timing, or a first radio network temporary identifier RNTI for scrambling the first DCI is used to indicate the first transmission timing.

In some possible designs, the SR/BSR resource includes a quantity of resource blocks (RBs), an RB location, or a code word resource.

In some possible designs, the network device allocates a plurality of RNTIs or a plurality of DCI resources to the terminal device by using L3 signaling.

According to an eighth aspect, a terminal device is provided, and the terminal device includes modules for performing the terminal device-based information transmission method in the seventh aspect. Based on a same inventive concept, a problem-resolving principle of the terminal device is corresponding to the solution of the method design in the seventh aspect. Therefore, for implementation of the terminal device, refer to the implementation of the method. No repeated description is provided.

According to a ninth aspect, a terminal device is provided, and the terminal device includes a transceiver, a memory, and a processor. The transceiver, the memory, and the processor are connected by using a system bus, the memory is configured to store an instruction, the processor is configured to execute the instruction stored in the memory, and when the program is executed, the processor is configured to perform the terminal device-based information transmission method in the seventh aspect.

According to a tenth aspect, an information transmission method is provided. The method includes: receiving, by a network device, first indication information sent by a terminal device, where the first indication information is used to indicate a first UL_grant timing corresponding to a first uplink service of the terminal device in a plurality of uplink grant UL_grant timings; and sending, by the network device based on the first UL_grant timing, first UL_grant information corresponding to the first uplink service.

In this embodiment of the present invention, the network device can determine, by using the first indication information sent by the terminal device, the first UL_grant timing corresponding to the first uplink service of the terminal device, so that when the network device uses a plurality of services, different UL_grant timings can be used for different services, to improve QoS of a service.

In a possible design, the receiving, by a network device, first indication information sent by a terminal device includes: receiving, by the network device, a first uplink scheduling request SR corresponding to the first uplink service and/or first buffer status information BSR corresponding to the first uplink service, where the first SR and the first BSR are sent by the terminal device, and a type of the first SR and/or a type of the first BSR are/is used to indicate the first UL_grant timing, or an air interface resource location that carries the first SR and/or the first BSR is used to indicate the first UL_grant timing.

In a possible design, the method further includes: determining, by the network device from a plurality of transmission timings, a first transmission timing corresponding to the first uplink service; and sending, by the network device, second indication information to the terminal device, where the second indication information is used to indicate the first transmission timing.

In this embodiment of the present invention, the network device can indicate, by using the second indication information, the first transmission timing corresponding to the first uplink service of the terminal device, so that when the network device uses a plurality of services, different first transmission timings can be used for different services, to improve QoS of a service.

In a possible design, the sending, by the network device, second indication information to the terminal device includes: sending, by the network device, first downlink control information DCI to the terminal device, where the first DCI includes the first UL_grant information, and format information of the first DCI is used to indicate the first transmission timing, or a specific information bit in the first DCI is used to indicate the first transmission timing, or an air interface resource location that carries the first DCI is used to indicate the first transmission timing, or a first radio network temporary identifier RNTI for scrambling the first DCI is used to indicate the first transmission timing.

In some possible designs, the SR/BSR resource includes a quantity of resource blocks (RBs), an RB location, or a code word resource.

In some possible designs, the network device allocates a plurality of RNTIs or a plurality of DCI resources to the terminal device by using L3 signaling.

According to an eleventh aspect, a network device is provided, and the network device includes modules for performing the network device-based information transmission method in the tenth aspect. Based on a same inventive concept, a problem-resolving principle of the network device is corresponding to the solution of the method design in the tenth aspect. Therefore, for implementation of the network device, refer to the implementation of the method. No repeated description is provided.

According to a twelfth aspect, a network device is provided, and the network device includes a transceiver, a memory, and a processor. The transceiver, the memory, and the processor are connected by using a system bus, the memory is configured to store an instruction, the processor is configured to execute the instruction stored in the memory, and when the program is executed, the processor is configured to perform the network device-based information transmission method in the tenth aspect.

DESCRIPTION OF EMBODIMENTS

The following describes technical solutions in embodiments of the present invention with reference to accompanying drawings.

Figure 1:
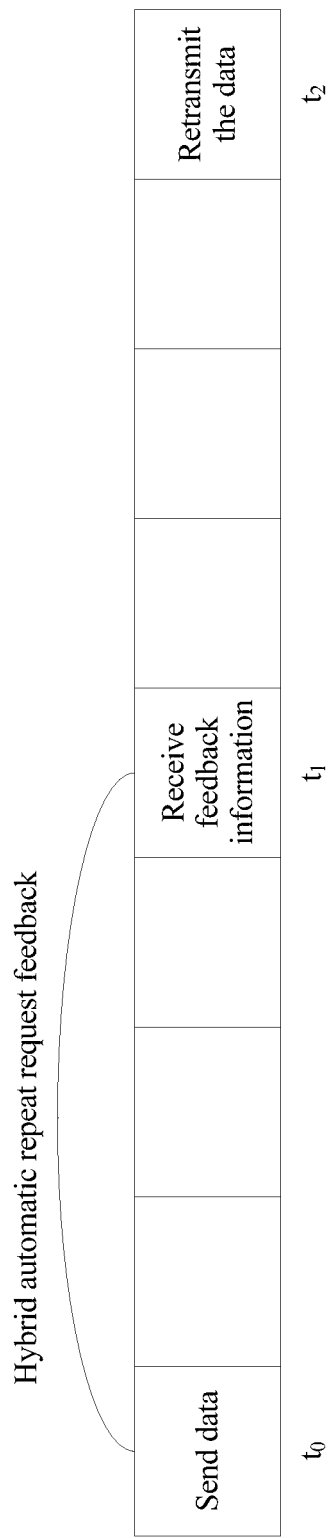
FIG. 1 is a schematic diagram of a HARQ feedback in uplink and downlink data transmission in the prior art.
Figure 2:
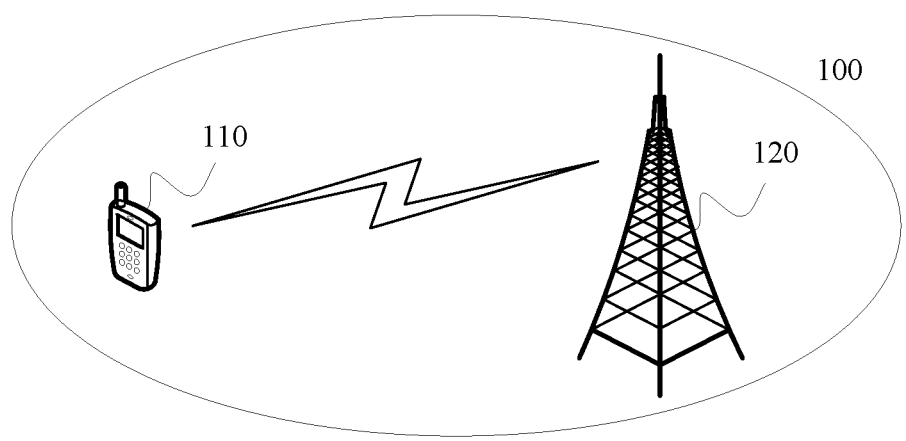
FIG. 2 is a schematic diagram of a scenario example to which an embodiment of the present invention is applicable.

FIG. 2 is an architectural diagram of a communications system 100 according to an embodiment of the present invention.

The communications system 100 may include a terminal device 110 and a network device 120. The network device 120 may communicate with the terminal device 110 through an air interface. The network device 120 may be a network-side entity configured to send or receive a signal, for example, a base station. UE may be any terminal, for example, the UE may be machine type communication (MTC) user equipment. The terminal device 110 and the network device 120 support transmission of a plurality of services, for example, an enhanced mobile broadband service, an ultra-reliable and low latency machine type communication service, and a massive machine type communication service in a 5G system.

The enhanced mobile broadband service requires a large amount of calculation in scheduling, and requires a high capacity and a high rate. However, the enhanced mobile broadband service has a low requirement for a latency, and the latency is usually 10 ms or above. To improve spectrum efficiency and avoid higher layer retransmission, a HARQ function is supported at or below a Media Access Control (MAC) layer.

The ultra-reliable and low latency machine type communication service is mainly used to send a latency emergency service, and reliability needs to be ensured. An expected latency is very short, and a minimum latency is 1 ms. For example, in a wireless-controlled industrial manufacturing or production process, a telemedicine operation, a smart grid supporting power distribution automation, or traffic safety, the ultra-reliable and low latency machine type communication service is also allowed to use the HARQ function.

Because quality of service (QoS) requirements of the enhanced mobile broadband service and the ultra-reliable and low latency machine type communication service are different, each service requires a different HARQ timing.

However, in an existing HARQ solution, when a terminal device has a plurality of different services, only a same HARQ timing can be used, and consequently quality of service requirements of the services cannot be met when the terminal device performs multi-service transmission.

Therefore, the present invention provides an information transmission method, so that the plurality of services of the terminal device can correspond to a plurality of HARQ timings, thereby improving quality of service of a service.

It should be understood that the foregoing 5G communications system is merely an example of a communications system to which the embodiments of the present invention are applicable. The embodiments of the present invention can also be applied to another communications system, provided that the communications system can support transmission of a plurality of services and some of the plurality of services can support the HARQ function.

For example, the embodiments of the present invention can be applied to a Global System for Mobile Communications (GSM), a Code Division Multiple Access (CDMA) system, a Wideband Code Division Multiple Access (WCDMA) system, a general packet radio service (GPRS) system, a 5G communications system, an LTE frequency division duplex (FDD) system, an LTE time division duplex (TDD) system, and a Universal Mobile Telecommunications System (UMTS).

The embodiments of this application are described with reference to a network device and a terminal device. The terminal device includes but is not limited to user equipment (UE), an access terminal, a subscriber unit, a subscriber station, a mobile station, a mobile console, a remote station, a remote terminal, a mobile device, a subscriber terminal, a terminal, a wireless communications device, a user agent, or a user apparatus. The terminal device may communicate with one or more core networks by using a radio access network (RAN). For example, the terminal device may be a cellular phone, a cordless phone, a Session Initiation Protocol (SIP) phone, a wireless local loop (WLL) station, a personal digital assistant (PDA), a handheld device with a wireless communication function, a computing device, another processing device connected to a wireless modem, an in-vehicle device, a wearable device, a terminal device in a future 5G network, or a terminal device in a future evolved PLMN network.

The network device in the embodiments of the present invention may be a device that is configured to communicate with the terminal device, and the network device may include a base station or a network-side device that has a base station function. For example, the network device may be a base transceiver station (BTS) in the GSM system or the CDMA system, or may be a NodeB (NB) in the WCDMA system, or may be an evolved NodeB (eNB or eNodeB) in the LTE system, or the network device may be a relay station, an access point, an in-vehicle device, a wearable device, or a network-side device in the future 5G network.

Figure 3:
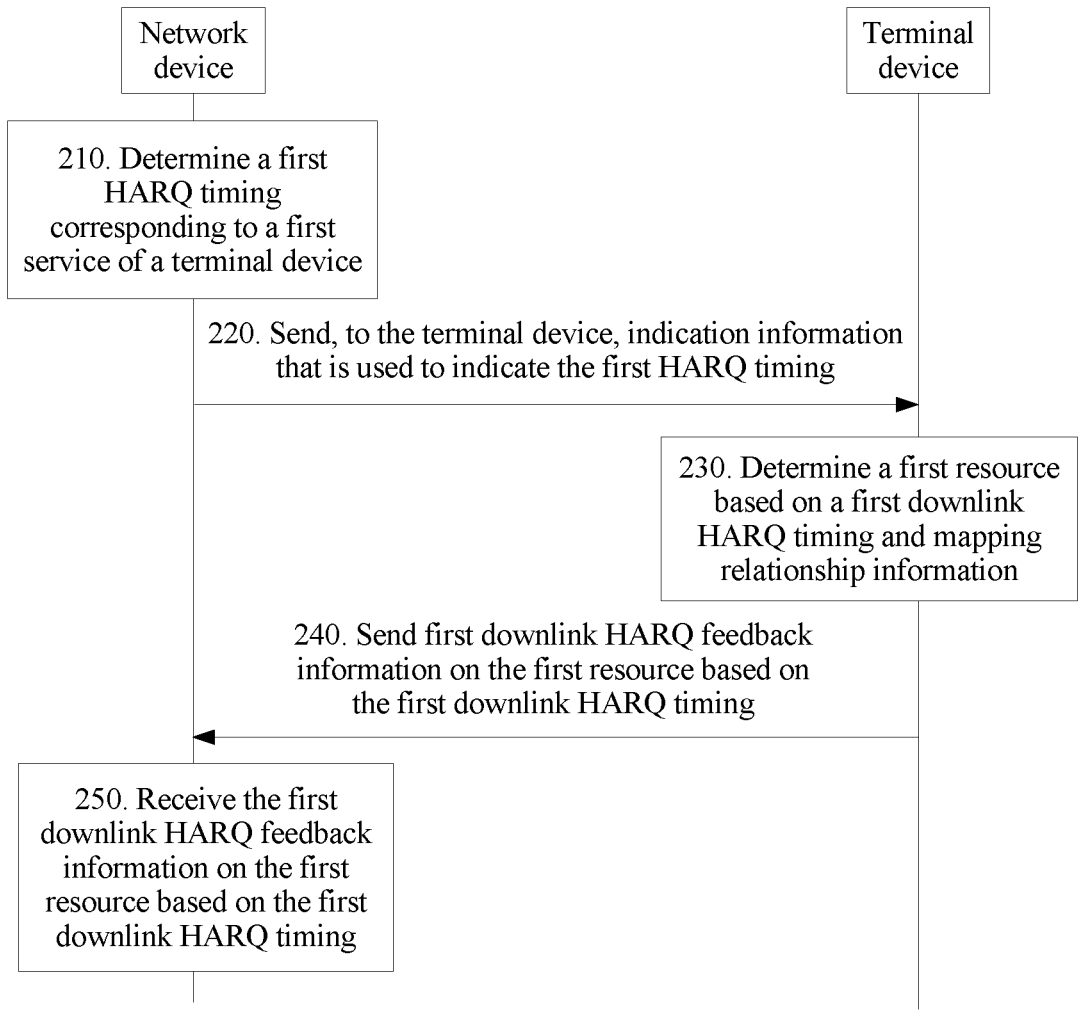
FIG. 3 is a schematic flowchart of an information transmission method according to an embodiment of the present invention.

FIG. 3 is a schematic flowchart of an information transmission method 200 according to an embodiment of the present invention.

210. A network device determines a first HARQ timing of a first service of a terminal device.

Specifically, the network device may allocate a plurality of HARQ timings to the terminal device, and determine, from the plurality of HARQ timings, the first HARQ timing corresponding to the first service of the terminal device. In other words, the terminal device receives or sends, based on the first HARQ timing by synchronizing the first HARQ timing corresponding to the first service, HARQ feedback information corresponding to the first service.

Therefore, this application provides an information transmission method. The network device allocates the plurality of HARQ timings to the terminal device, so that when the terminal device uses a plurality of services, different HARQ timings can be used for different services, to improve QoS of a service.

In this embodiment of the present invention, a HARQ timing is specifically a time sequence relationship between sending data by a transmit end and sending feedback information by a receive end. The HARQ timing may also be referred to as a HARQ timing, a HARQ feedback timing, a HARQ feedback period, a HARQ timing relationship, a HARQ feedback timing relationship, a HARQ feedback time sequence, or the like. This is not limited in this application.

It should be understood that in this application, each of a plurality of services may use a different HARQ timing, and the first HARQ timing is a HARQ timing corresponding to the first service.

220. The network device sends, to the terminal device, indication information that is used to indicate the first HARQ timing.

Specifically, the network device sends the indication information to the terminal device, where the indication information is used to indicate the first HARQ timing corresponding to the first service of the terminal device, so that the terminal device receives or sends, based on the first HARQ timing, the HARQ feedback information corresponding to the first service.

A HARQ includes a downlink HARQ and an uplink HARQ. The downlink HARQ is for downlink shared channel (DL-SCH) data, and the uplink HARQ is for uplink shared channel (UL-SCH) data. The downlink HARQ and the uplink HARQ are independent of each other, and processing manners of the downlink HARQ and the uplink HARQ are also different. Corresponding to the downlink HARQ and the uplink HARQ, the first HARQ timing is a first downlink HARQ timing and a first uplink HARQ timing.

For example, for a downlink HARQ process, the first HARQ timing is the first downlink HARQ timing. To be specific, when the first service is a first downlink service, a HARQ timing corresponding to the first downlink service is the first downlink HARQ timing. The network device sends the first downlink service to the terminal device, and indicates the first downlink HARQ timing corresponding to the first downlink service to the terminal device.

Optionally, the network device sends first downlink control information (DCI) corresponding to the first service to the terminal device, where a type of the first DCI is used to indicate the first HARQ timing.

Specifically, the network device sends DCI information to the terminal device in a downlink, where the DCI information is used to indicate a downlink data transmission resource or an uplink data transmission resource. A plurality of types of DCI may be included, for example, DCI 0, DCI 1, and DCI 2 in LTE, and different DCI types are corresponding to different HARQ timings. That is, the network device sends the DCI information to the terminal device, and the terminal device may identify, by using a DCI type, a specific HARQ timing to be used for current data transmission.

Optionally, the network device sends first DCI corresponding to the first service to the terminal device, where a specific information bit in the first DCI is used to indicate the first HARQ timing.

Specifically, "which HARQ timing used for data transmission" is indicated by using the specific information bit in the DCI information. The specific information bit may be an information bit newly added to a DCI message or may be an existing information bit. That is, the network device sends the DCI information to the terminal device. The terminal device may identify, by identifying information about the specific information bit in the DCI, a specific HARQ timing to be used for current data transmission.

Optionally, the network device sends first DCI corresponding to the first service to the terminal device, where an air interface resource location that carries the first DCI is used to indicate the first HARQ timing.

Specifically, the network device pre-establishes a mapping relationship between a HARQ timing and an air interface resource location that carries a DCI message. The network device sends a DCI message by using a specific air interface resource. If the terminal device detects the DCI in a specific air interface resource area, the terminal device may determine, based on the specific air interface resource and the mapping relationship, a specific HARQ timing to be used for current data transmission. For example, an air interface resource that carries DCI is an air interface resource of a physical downlink control channel (PDCCH), or an air interface resource of an enhanced physical downlink control channel (E-PDCCH).

Optionally, the air interface resource includes a resource block (RB) location, a quantity of RBs, a code word resource, a sequence number, or the like.

Optionally, the network device sends first DCI corresponding to the first service to the terminal device, where a first radio network temporary identifier RNTI for scrambling the first DCI is used to indicate the first HARQ timing.

Specifically, the network device sends DCI information to the terminal device in a downlink. The DCI needs to be scrambled by using an RNTI in channel coding, the RNTI for scrambling the DCI is associated with a HARQ timing, and each RNTI is corresponding to a different HARQ timing. That is, the network device uses a specific RNTI to scramble the DCI, and the specific RNTI is used to indicate, to the terminal device, a specific HARQ timing to be used for current data transmission. The terminal device needs to learn of a plurality of RNTIs to identify RNTI information in current DCI, and further obtain the specific HARQ timing to be used for current data transmission.

It should be understood that the network device sends the indication information to the terminal device, and implicitly indicates a HARQ timing by using a plurality of methods in a process in which the network device indicates an allocated resource. For example, DCI information is sent to the terminal device in a downlink to implicitly indicate a HARQ timing. Alternatively, a HARQ timing of a service may be directly indicated. For example, indication information used to indicate a HARQ timing is directly sent. This is not limited in this application.

Therefore, according to the information transmission method provided in this application, when a plurality of HARQ timings exist in an air interface, the indication information is used to indicate the first HARQ timing of the first service of the terminal device, so that a HARQ feedback conflict can be avoided and QoS of a service is further improved.

In an existing HARQ technology, after receiving acknowledgment information (ACK/NACK), the transmit end needs to determine, by using a fixed timing between the acknowledgment information and transmitted data, a HARQ process (HARQ process) corresponding to the acknowledgment information. In other words, the HARQ process corresponding to the acknowledgment information is determined by using the timing between the transmitted data and the corresponding ACK/NACK.

However, a terminal device or a network device in this application can use a plurality of HARQ timings. Therefore, the receive end may simultaneously feedback a plurality of pieces of HARQ ACK/NACK information in a specific subframe. Therefore, after receiving the HARQ ACK/NACK information, the transmit end needs to distinguish a specific HARQ timing in the plurality of HARQ timings that is corresponding to each piece of HARQ ACK/NACK information.

Optionally, in a service establishment process, when allocating the plurality of HARQ timings to the terminal device, the network device allocates different air interface resources to different HARQ timings to send HARQ feedback information.

For example, the network device sends information about a mapping relationship between a HARQ timing and a resource to the terminal device, where the mapping relationship information includes the plurality of HARQ timings and a resource corresponding to each of the plurality of HARQ timings. When receiving HARQ ACK/NACK information on an air interface resource, the transmit end may directly determine a HARQ timing of the HARQ ACK/NACK information based on the air interface resource and the mapping relationship information.

Optionally, the mapping relationship information includes the following correspondences:

a plurality of downlink HARQ timings and a physical uplink control channel PUCCH resource corresponding to each of the plurality of downlink HARQ timings, a plurality of downlink HARQ timings and a physical uplink shared channel PUSCH resource corresponding to each of the plurality of downlink HARQ timings, and a plurality of uplink HARQ timings and a physical hybrid automatic repeat request indicator channel PHICH resource corresponding to each of the plurality of uplink HARQ timings.

Specifically, after the mapping relationship information is synchronized between the transmit end and the receive end, the transmit end and the receive end determine, based on the first HARQ timing indicated by the indication information and the mapping relationship information, a first resource that carries the first HARQ feedback information corresponding to the first service, the transmit end receives the first HARQ feedback information on the first resource based on the first HARQ timing, and the receive end sends the first HARQ feedback information to the transmit end on the first resource based on the first HARQ timing.

For example, for the downlink HARQ process, the terminal device sends, based on the mapping relationship information, a feedback message on an air interface resource corresponding to the first downlink HARQ timing, and the network device may determine, based on the mapping relationship information and the air interface resource for receiving, a HARQ timing corresponding to the feedback message as soon as the network device receives the feedback message on the air interface resource.

Further, FIG. 3 is a schematic flowchart of a feedback information transmission method 200 of a downlink HARQ.

230. Determine a first resource based on a first downlink HARQ timing and mapping relationship information.

Specifically, the terminal device determines, based on the first downlink HARQ timing and the mapping relationship information, that the first downlink HARQ timing is corresponding to the first resource.

240. Send first downlink HARQ feedback information on the first resource based on the first downlink HARQ timing.

Specifically, the terminal device sends, on the first resource based on the first downlink HARQ timing, the first downlink HARQ feedback information corresponding to the first service to the network device.

250. Receive the first downlink HARQ feedback information on the first resource based on the first downlink HARQ timing.

Specifically, the network device determines, based on the first downlink HARQ timing and the mapping relationship information, that the first downlink HARQ timing is corresponding to the first resource, and receives, on the first resource based on the first downlink HARQ timing, the first downlink HARQ feedback information that is sent by the terminal device and that is corresponding to the first service.

Therefore, the network device receives the first downlink HARQ feedback information on the first resource corresponding to the first downlink HARQ timing, to distinguish a downlink HARQ timing corresponding to each piece of downlink HARQ feedback information, thereby improving QoS of a service.

For another example, for an uplink HARQ process, the first HARQ timing is the first uplink HARQ timing. The terminal device sends the first service to the network device, and indicates the first uplink HARQ timing corresponding to the first service to the network device.

Specifically, the network device determines, based on the first uplink HARQ timing and the mapping relationship information, that the first uplink HARQ timing is corresponding to the first resource, and sends, on the first resource based on the first uplink HARQ timing, first uplink HARQ feedback information corresponding to the first service to the terminal device. The terminal device determines, based on the first uplink HARQ timing and the mapping relationship information, that the first uplink HARQ timing is corresponding to the first resource, and receives, on the first resource based on the first uplink HARQ timing, the first uplink HARQ feedback information that is sent by the network device and that is corresponding to the first service.

Therefore, the terminal device receives the first uplink HARQ feedback information on the first resource corresponding to the first uplink HARQ timing, to distinguish an uplink HARQ timing corresponding to each piece of uplink HARQ feedback information, thereby improving QoS of a service.

It should be understood that the transmit end may determine, by using the correspondence between a HARQ timing and a resource, that the first HARQ timing of the first service is corresponding to the first resource, and receive the first HARQ feedback information on the first resource. Alternatively, the transmit end may directly receive the HARQ feedback information, and then determine, based on the correspondence information and a resource for receiving information, a HARQ timing corresponding to each piece of HARQ feedback information. This is not limited in this application.

Optionally, the network device sends L3 signaling to the terminal device, where the L3 signaling carries the mapping relationship information.

For example, the L3 signaling sent by the network device to the terminal device carries content in the following forms:
{Resource of a downlink HARQ timing 1
[PUCCH resource: (RB location, quantity of RBs, format information, code word information, and sequence number)
PUSCH field: (field sequence number)]
Resource of a downlink HARQ timing 2
[PUCCH resource: (RB location, quantity of RBs, format information, code word information, and sequence number)
PUSCH field: (field sequence number)]
Resource of an uplink HARQ timing 1
[PHICH resource: (RB location, quantity of RBs, format information, code word information, and sequence number)]
Resource of an uplink HARQ timing 2
[PHICH resource: (RB location, quantity of RBs, format information, code word information, and sequence number)]}

Specifically, at a same TTI moment, the terminal device may send a plurality of pieces of HARQ feedback information by using a plurality of different resources. The network device may also send a plurality of pieces of HARQ feedback information by using a plurality of different resources. The terminal device or the network device determines a corresponding HARQ timing based on a service type of transmitted data, and further determines a corresponding resource.

For example, when the terminal device needs to feed back HARQ ACK/NACK information by using the HARQ timing 1, the terminal device uses the resource indicated by the downlink HARQ timing 1 to send the HARQ ACK/NACK information. When the terminal device needs to feed back HARQ ACK/NACK information by using the HARQ timing 2, the terminal device uses the resource indicated by the downlink HARQ timing 2 to send the HARQ ACK/NACK information. After receiving HARQ feedback information on a specific air interface resource, the network device may learn of a HARQ timing corresponding to the feedback message.

For another example, when the network device needs to feed back HARQ ACK/NACK information by using the uplink HARQ timing 1, the network device uses the resource indicated by the uplink HARQ timing 1 to send the HARQ ACK/NACK information. When the network device needs to feed back HARQ ACK/NACK information by using the uplink HARQ timing 2, the network device uses the resource indicated by the uplink HARQ timing 2 to send the HARQ ACK/NACK information. After receiving HARQ feedback information on a corresponding resource, the terminal device may learn of a HARQ timing corresponding to the feedback message.

Therefore, when allocating the plurality of HARQ timings to the terminal device, the network device allocates different air interface resources to different HARQ timings to send HARQ feedback information. In this way, the transmit end can distinguish a HARQ timing corresponding to each piece of HARQ feedback information, to improve QoS of a service.

It should be understood that the mapping relationship may be indicated by the network device to the terminal device by using the L3 signaling, or may be indicated to the terminal device in another manner. For example, the mapping relationship is preconfigured in the terminal device and the network device. This is not limited in this application.

Based on a same inventive concept, in existing uplink scheduling data transmission, the terminal device sends a request (Request) to the network device. After receiving the request, the network device sends uplink grant (UL_grant) information to the terminal device by using a DCI message, where the UL_grant information indicates which uplink air interface resource can be used for data transmission and how much data can be transmitted. The terminal device sends uplink data (Data Tx) on an air interface resource indicated in the UL_grant information. The request sent by the terminal device in an uplink may be an uplink scheduling request (SR) or buffer status information (BSR). There is a timing between messages. For example, there is a UL_grant timing between the UL_grant and the request, and the UL_grant timing is specifically a time sequence relationship between the UL_grant and the request. For another example, there is a transmission timing between a grant and the data Tx, and the transmission timing is specifically a time sequence relationship between the grant and the data Tx.

Because a QoS requirement of each service is different, when a single terminal device needs to establish a plurality of services, a plurality of UL_grant timings and a plurality of transmission timings need to be used in an air interface.

For example, for uplink data transmission of a service 1, an interval of two subframes is required between the request and the UL_grant, and an interval of three subframes is required between the UL_grant and the data Tx. For uplink data transmission of a service 2, an interval of four subframes is required between the request and the UL_grant, and an interval of four subframes is required between the UL_grant and the data Tx. Therefore, uplink scheduling data transmission messages corresponding to different timings may be simultaneously sent.

According to the information transmission method provided in this application, the network device allocates the plurality of UL_grant timings and the plurality of transmission timings to the terminal device, so that the terminal device can use different UL_grant timings and/or different transmission timings for different uplink services.

Figure 4:
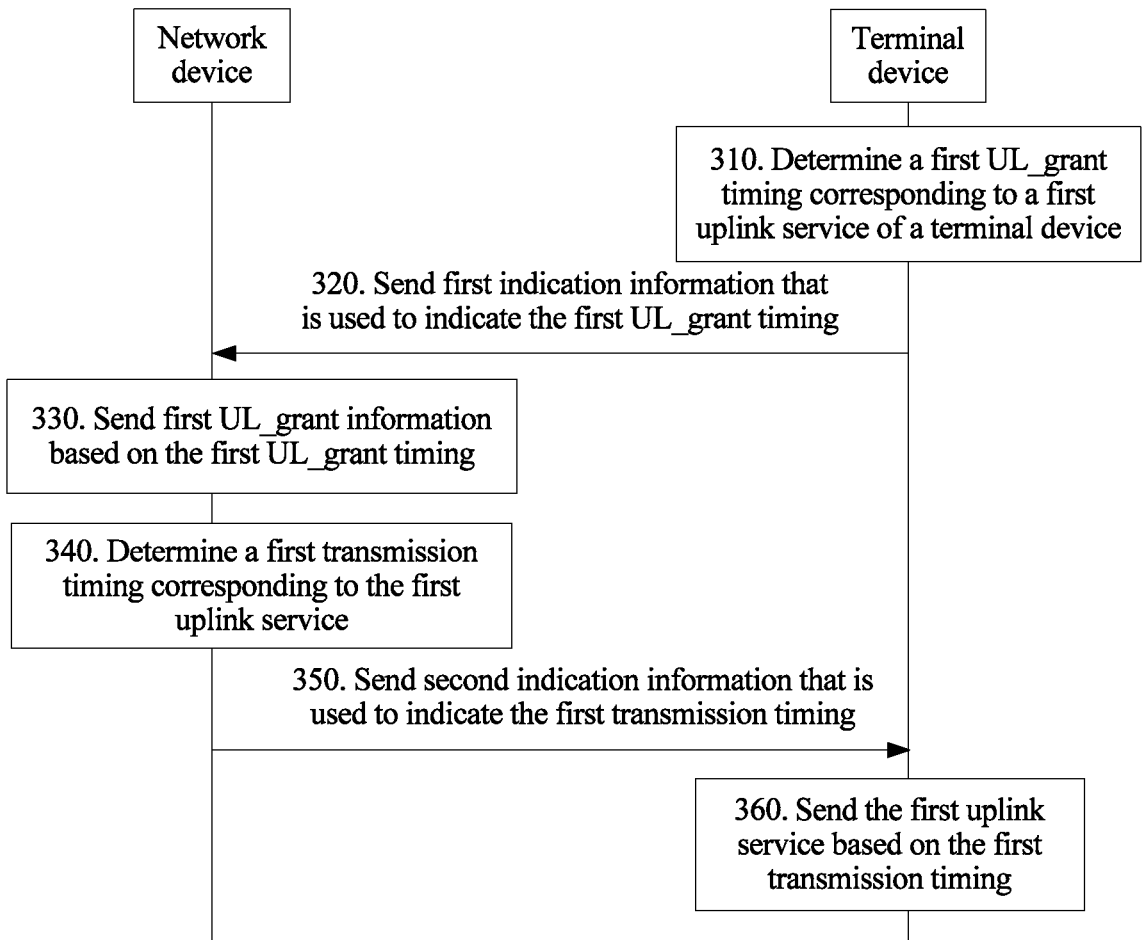
FIG. 4 is a schematic flowchart of an information transmission method according to an embodiment of the present invention.

FIG. 4 is a schematic flowchart of an uplink scheduling data transmission method 300 according to an embodiment of the present invention.

310. A terminal device determines a first uplink grant UL_grant timing corresponding to a first uplink service of the terminal device.

Specifically, a network device allocates a plurality of UL_grant timings to the terminal device, and the terminal device determines, from the plurality of UL_grant timings, the first UL_grant timing corresponding to the first uplink service of the terminal device.

320. The terminal device sends first indication information that is used to indicate the first UL_grant timing.

Specifically, the terminal device sends the first indication information to the network device, where the first indication information is used to indicate the first UL_grant timing, so that the network device sends first UL_grant information corresponding to the first uplink service to the terminal device based on the first UL_grant timing.

Optionally, the network device receives a first uplink scheduling request SR corresponding to the first uplink service and/or first buffer status information BSR corresponding to the first uplink service, where the first SR and the first BSR are sent by the terminal device, and a type of the first SR and/or a type of the first BSR are/is used to indicate the first UL_grant timing.

Specifically, a plurality of request message types are defined for an air interface, for example, an SR and/or a BSR, and a new request type that is added on this basis. Different request types are used to indicate different UL_grant timings.

For example, an uplink SR1 and an uplink SR2 are defined, the SR1 is used to indicate a UL_grant timing 1, and the SR2 is used to indicate a UL_grant timing 2. The terminal device determines to send the SR1 or the SR2 based on a requirement for sending uplink data. If the network device detects the SR1, the UL_grant timing 1 is used. That is, after receiving an SR1 message, the network device feeds back UL_grant information to the terminal device in N subframes. If the network device detects the SR2, the UL_grant timing 2 is used. That is, after receiving an SR2 message, the network device feeds back UL_grant information to the terminal device in M subframes.

Optionally, the network device receives a first uplink scheduling request SR corresponding to the first uplink service and/or first buffer status information BSR corresponding to the first uplink service, where the first SR and the first BSR are sent by the terminal device, and an air interface resource location that carries the first SR and/or the first BSR is used to indicate the first UL_grant timing.

Specifically, in different air interface resource locations, the network device allocates a plurality of SR/BSR resources to the terminal device. Each SR/BSR resource is correspondingly used for an associated UL_grant timing.

For example, a resource 1 or a resource 2 is defined, the resource 1 is used to indicate a UL_grant timing 1, and the resource 2 is used to indicate a UL_grant timing 2. The terminal device sends an SR/BSR message on the resource 1 or the resource 2 based on a requirement for sending uplink data. If the network device detects the SR/BSR message in a location of the resource 1, the UL_grant timing 1 is used. That is, after receiving the SR/BSR message, the network device feeds back a UL_grant information to the terminal device in N subframes. If the network device detects the SR/BSR message in a location of the resource 2, the UL_grant timing 2 is used. That is, after receiving the SR/BSR message, the network device feeds back a UL_grant information to the terminal device in M subframes.

Optionally, the network device allocates the plurality of SR/BSR resources to the terminal device by using L3 signaling.

Optionally, the SR/BSR resource includes a quantity of resource blocks (RBs), an RB location, or a code word resource.

It should be understood that the terminal device may implicitly indicate the first UL_grant timing by using the type of the first SR and/or the type of the first BSR or by using a resource that carries the first SR and/or the first BSR, or may directly indicate the first UL_grant timing to the network device. This is not limited in this application.

330. The network device sends first UL_grant information based on the first UL_grant timing.

Specifically, the network device receives the first indication information sent by the terminal device, where the first indication information is used to indicate the first UL_grant timing corresponding to the first uplink service of the terminal device in the plurality of uplink grant UL_grant timings. The network device sends the first UL_grant information corresponding to the first uplink service to the terminal device based on the first UL_grant timing.

340. The network device determines a first transmission timing corresponding to the first uplink service.

Specifically, the network device may allocate a plurality of transmission timings to the terminal device, and determine, from the plurality of transmission timings, the first transmission timings corresponding to the first uplink service. The network device sends second indication information to the terminal device, where the second indication information is used to indicate the first transmission timing.

Therefore, this application provides an information transmission method. The network device allocates the plurality of transmission timings to the terminal device, so that when the terminal device uses a plurality of services, different transmission timings can be used for different services, to improve QoS of a service.

It should be understood that in this application, each of a plurality of services may use a different transmission timing, and the first transmission timing is a transmission timing corresponding to the first uplink service.

350. The network device sends, to the terminal device, second indication information that is used to indicate the first transmission timing.

Specifically, the network device sends indication information to the terminal device, where the indication information is used to indicate the first transmission timing corresponding to the first uplink service of the terminal device, so that the terminal device sends uplink data to the network device based on the first transmission timing.

Optionally, the network device sends first downlink control information DCI corresponding to the first UL_grant information to the terminal device, where format information of the first DCI is used to indicate the first transmission timing.

Specifically, a plurality of DCI types are defined for the air interface. A transmission timing is associated with a DCI type that carries UL_grant information, and a specific DCI type is corresponding to a specific transmission timing.

For example, DCI 0a, DCI 0b, and DCI 0c are respectively corresponding to a transmission timing 1, a transmission timing 2, and a transmission timing 3. When determining to use the transmission timing 1, the network device sends UL_grant information to the terminal device by using the DCI 0a, and after receiving the DCI 0a, the terminal device sends data at intervals of N subframes. When determining to use the transmission timing 2, the network device sends UL_grant information to the terminal device by using the DCI 0b, and after receiving the DCI 0b, the terminal device sends data at intervals of M subframes. When determining to use the transmission timing 3, the network device sends UL_grant information to the terminal device by using the DCI 0c, and after receiving the DCI 0c, the terminal device sends data at intervals of K subframes.

Optionally, the network device sends first downlink control information DCI corresponding to the first UL_grant information to the terminal device, where a specific information bit in the first DCI is used to indicate the first transmission timing.

Specifically, the specific information bit in the first DCI message corresponding to the first UL_grant information is used to associate with a transmission timing.

For example, a 1-bit specific information bit is set in DCI. 0 indicates a transmission timing 1, and 1 indicates a transmission timing 2. When the network device determines to use the transmission timing 1, the specific information bit in the DCI indicates 0, and the network device sends UL_grant information to the terminal device. After receiving a DCI UL_grant, the terminal device detects that the specific information bit is 0, and sends data at intervals of N subframes. When the network device determines to use the transmission timing 2, the specific information bit in the DCI indicates 1, and the network device sends UL_grant information to the terminal device. After receiving a DCI UL_grant, the terminal device detects that the specific information bit is 1, and sends data at intervals of M subframes.

Optionally, the network device sends first downlink control information DCI corresponding to the first UL_grant information to the terminal device, where an air interface resource location that carries the first DCI is used to indicate the first transmission timing.

Specifically, a transmission timing is associated with DCI in a specific resource location. That is, DCI detected by the terminal device in different resource locations has different transmission timings.

For example, a resource 1, a resource 2, and a resource 3 are respectively corresponding to a transmission timing 1, a transmission timing 2, and a transmission timing 3. When determining to use the transmission timing 1, the network device sends DCI on the resource 1 and indicates UL_grant information to the terminal device, and after receiving the DCI, the terminal device sends data at intervals of N subframes. When determining to use the transmission timing 2, the network device sends DCI on the resource 2 and indicates UL_grant information to the terminal device, and after receiving the DCI, the terminal device sends data at intervals of M subframes. When determining to use the transmission timing 3, the network device sends DCI on the resource 3 and indicates UL_grant information to the terminal device, and after receiving the DCI, the terminal device sends data at intervals of K subframes.

Optionally, the resource includes a quantity of RBs, an RB location, a CCE (control channel element)/ECCE (enhanced control channel element) location, or a code resource.

Optionally, the network device allocates a plurality of groups of DCI resources to the terminal device by using L3 signaling.

Optionally, the network device sends first downlink control information DCI corresponding to the first UL_grant information to the terminal device, where a first radio network temporary identifier RNTI for scrambling the first DCI is used to indicate the first transmission timing.

Specifically, different RNTIs are used for scrambling in a channel coding process of DCI. The network device allocates a plurality of RNTIs to the terminal device. Each RNTI is correspondingly used for an associated transmission timing.

For example, an RNTI-1, an RNTI-2, and an RNTI-3 are respectively corresponding to a transmission timing 1, a transmission timing 2, and a transmission timing 3. When determining to use the transmission timing 1, the network device uses the RNTI-1 to scramble DCI and indicates UL_grant information to the terminal device, and after receiving the DCI, the terminal device sends data at intervals of N subframes. When determining to use the transmission timing 2, the network device uses the RNTI-2 to scramble DCI and indicates UL_grant information to the terminal device, and after receiving the DCI, the terminal device sends data at intervals of M subframes. When determining to use the transmission timing 3, the network device uses the RNTI-3 to scramble DCI and indicates UL_grant information to the terminal device, and after receiving the DCI, the terminal device sends data at intervals of K subframes.

Optionally, the network device allocates the plurality of RNTIs to the terminal device by using L3 signaling.

Therefore, according to the information transmission method provided in this application, the second indication information is used to indicate the first transmission timing corresponding to the first uplink service of the terminal device, so that QoS of a service is improved when the plurality of transmission timings can simultaneously exist in the air interface.

It should be understood that the network device may implicitly indicate the first transmission timing by delivering DCI to the terminal device, or may directly indicate the first transmission timing to the terminal device. This is not limited in this application.

360. The terminal device sends the first uplink service based on the first transmission timing.

Specifically, the terminal device sends, based on the first transmission timing, uplink data of the first uplink service on an air interface resource indicated in UL_grant information.

Therefore, according to the information transmission method provided in this application, the first indication information is used to indicate the first UL_grant timing corresponding to the first uplink service of the terminal device to the network device, and the second indication information is used to indicate the first transmission timing corresponding to the first uplink service of the terminal device, so that QoS of a service is improved.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In an implementation process, the steps in the foregoing methods may be implemented by using a hardware integrated logical circuit in a processor or by using an instruction in a form of software. The steps in the foregoing methods may alternatively be directly implemented by a hardware processor or implemented by using a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in a memory, and the processor executes an instruction in the memory and completes the steps in the foregoing methods in combination with the hardware in the processor. To avoid repetition, details are not described herein.

Figure 5:
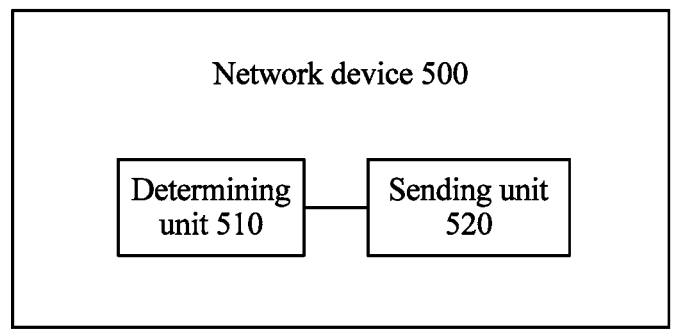
FIG. 5 is a schematic block diagram of a network device according to an embodiment of the present invention.

FIG. 5 is a schematic block diagram of a network device 500 according to an embodiment of the present invention. As shown in FIG. 5, the network device 500 includes:

a determining unit 510, configured to determine, from a plurality of hybrid automatic repeat request HARQ timings, a first HARQ timing corresponding to a first service of a terminal device; and a sending unit 520, configured to send indication information to the terminal device, where the indication information is used to indicate the first HARQ timing.

Optionally, the sending unit 520 is specifically configured to:

send first downlink control information DCI corresponding to the first service to the terminal device, where a type of the first DCI is used to indicate the first HARQ timing, or a specific information bit in the first DCI is used to indicate the first HARQ timing, or an air interface resource location that carries the first DCI is used to indicate the first HARQ timing, or a first radio network temporary identifier RNTI for scrambling the first DCI is used to indicate the first HARQ timing.

Optionally, before the determining unit 510 determines, from the plurality of hybrid automatic repeat request HARQ timings, the first HARQ timing corresponding to the first service of the terminal device, the sending unit 520 is further configured to:

send information about a mapping relationship between a HARQ timing and a resource to the terminal device, where the mapping relationship information includes the plurality of HARQ timings and a resource corresponding to each of the plurality of HARQ timings.

Optionally, the sending unit 520 is specifically configured to:

send L3 signaling to the terminal device, where the L3 signaling carries the mapping relationship information.

Optionally, the first HARQ timing is a first downlink HARQ timing, and the determining unit 510 is specifically configured to determine, based on the first downlink HARQ timing and the mapping relationship information, a first resource corresponding to the first downlink HARQ timing. The network device 500 further includes: a receiving unit, configured to receive, on the first resource based on the first downlink HARQ timing, first downlink HARQ feedback information that is sent by the terminal device and that is corresponding to the first service.

Optionally, the first HARQ timing is a first uplink HARQ timing, and the determining unit 510 is specifically configured to determine, based on the first uplink HARQ timing and the mapping relationship information, a first resource corresponding to the first uplink HARQ timing. The sending unit 520 is specifically configured to send, on the first resource based on the first uplink HARQ timing, first uplink HARQ feedback information corresponding to the first service to the terminal device.

Optionally, the first resource includes at least one of a resource block RB location, a quantity of RBs, code word information, and a sequence number.

Optionally, the mapping relationship information includes the following correspondences:

a plurality of downlink HARQ timings and a physical uplink control channel PUCCH resource corresponding to each of the plurality of downlink HARQ timings, a plurality of downlink HARQ timings and a physical uplink shared channel PUSCH resource corresponding to each of the plurality of downlink HARQ timings, and a plurality of uplink HARQ timings and a physical hybrid automatic repeat request indicator channel PHICH resource corresponding to each of the plurality of uplink HARQ timings.

It should be understood that, the network device 500 in this embodiment of the present invention may be corresponding to the network device in the method embodiment of the present invention, and operations and/or functions of each module in the network device 500 and other modules are separately used to implement the corresponding procedures of the method 200. For brevity, details are not described herein again.

Figure 6:
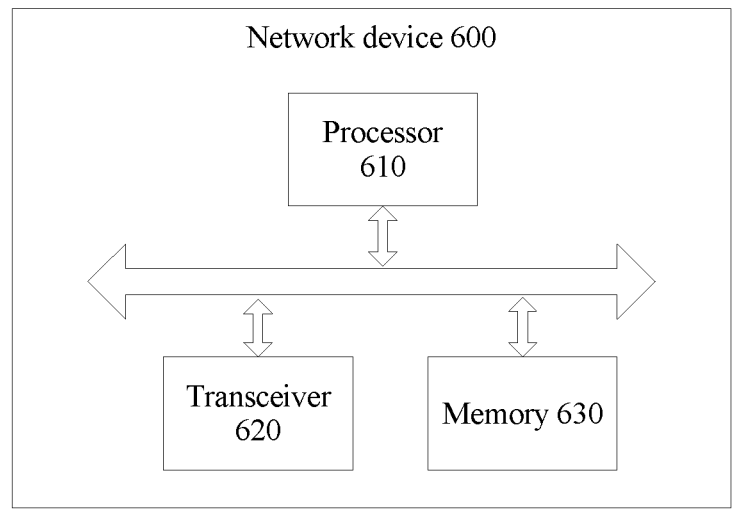
FIG. 6 is a schematic block diagram of a network device according to an embodiment of the present invention.

FIG. 6 is a schematic block diagram of a network device 600 according to another embodiment of the present invention. As shown in FIG. 6, the network device 600 includes:

a processor 610, a transceiver 620, and a memory 630, where the processor 610, the transceiver 620, and the memory 630 are connected by using a bus system, the memory 630 is configured to store an instruction, and the processor 610 is configured to execute the instruction stored in the memory 630, to control the transceiver 620 to receive or send a signal.

The processor 610 is configured to determine, from a plurality of hybrid automatic repeat request HARQ timings, a first HARQ timing corresponding to a first service of a terminal device.

The transceiver 620 is configured to send indication information to the terminal device, where the indication information is used to indicate the first HARQ timing.

Optionally, before the processor 610 determines, from the plurality of hybrid automatic repeat request HARQ timings, the first HARQ timing corresponding to the first service of the terminal device, the transceiver 620 is further configured to send information about a mapping relationship between a HARQ timing and a resource to the terminal device, where the mapping relationship information includes the plurality of HARQ timings and a resource corresponding to each of the plurality of HARQ timings.

It should be understood that the network device 600 in this embodiment of the present invention may be corresponding to the network device in the method embodiment of the present invention, or may be corresponding to an operation and/or a function of each module in the network device 500. For brevity, details are not described herein again.

Figure 7:
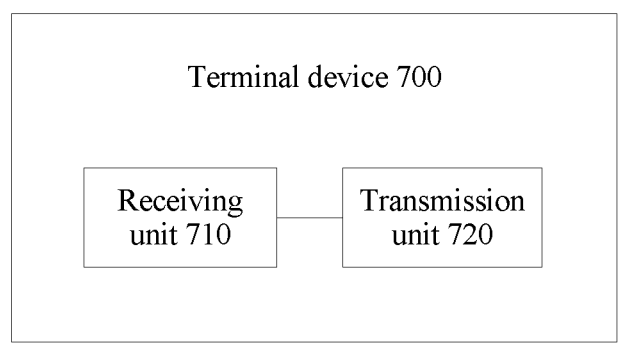
FIG. 7 is a schematic block diagram of a terminal device according to an embodiment of the present invention.

FIG. 7 is a schematic block diagram of a terminal device 700 according to an embodiment of the present invention. As shown in FIG. 7, the terminal device 700 includes:

a receiving unit 710, configured to receive indication information sent by a network device, where the indication information is used to indicate a first HARQ timing corresponding to a first service of the terminal device in a plurality of hybrid automatic repeat request HARQ timings; and a transmission unit 720, configured to receive or send, based on the first HARQ timing, HARQ feedback information corresponding to the first service.

Optionally, the receiving unit 710 is specifically configured to:

receive first downlink control information DCI that is sent by the network device and that is corresponding to the first service, where a type of the first DCI is used to indicate the first HARQ timing, or a specific information bit in the first DCI is used to indicate the first HARQ timing, or an air interface resource location that carries the first DCI is used to indicate the first HARQ timing, or a first radio network temporary identifier RNTI for scrambling the first DCI is used to indicate the first HARQ timing.

Optionally, before the receiving unit 710 receives the indication information sent by the network device, the receiving unit 710 is further configured to:

receive information that is about a mapping relationship between a HARQ timing and a resource and that is sent by the network device, where the mapping relationship information includes the plurality of HARQ timings and a resource corresponding to each of the plurality of HARQ timings.

Optionally, the transmission unit 720 is specifically configured to:

send L3 signaling to the terminal device, where the L3 signaling carries the mapping relationship information.

Optionally, the first HARQ timing is a first downlink HARQ timing, and the transmission unit 720 is specifically configured to:

determine, based on the first downlink HARQ timing and the mapping relationship information, a first resource corresponding to the first downlink HARQ timing, and send, on the first resource based on the first downlink HARQ timing, first downlink HARQ feedback information corresponding to the first service to the network device.

Optionally, the first HARQ timing is a first uplink HARQ timing, and the transmission unit 720 is specifically configured to:

determine, based on the first uplink HARQ timing and the mapping relationship information, a first resource corresponding to the first uplink HARQ timing, and receive, on the first resource based on the first uplink HARQ timing, first uplink HARQ feedback information that is sent by the network device and that is corresponding to the first service.

Optionally, the first resource includes at least one of a resource block RB location, a quantity of RBs, code word information, and a sequence number.

Optionally, the mapping relationship information includes the following correspondences:

a plurality of downlink HARQ timings and a physical uplink control channel PUCCH resource corresponding to each of the plurality of downlink HARQ timings, a plurality of downlink HARQ timings and a physical uplink shared channel PUSCH resource corresponding to each of the plurality of downlink HARQ timings, and a plurality of uplink HARQ timings and a physical hybrid automatic repeat request indicator channel PHICH resource corresponding to each of the plurality of uplink HARQ timings.

It should be understood that, the terminal device 700 in this embodiment of the present invention may be corresponding to the terminal device in the method embodiment of the present invention, and operations and/or functions of each module in the terminal device 700 and other modules are separately used to implement the corresponding procedures of the method 200. For brevity, details are not described herein again.

Figure 8:
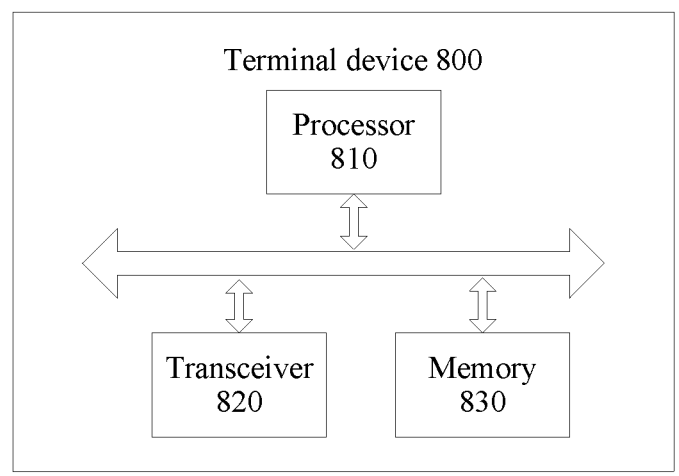
FIG. 8 is a schematic block diagram of a terminal device according to an embodiment of the present invention.

FIG. 8 is a schematic block diagram of a terminal device 800 according to another embodiment of the present invention. As shown in FIG. 8, the terminal device 800 includes:

a processor 810, a transceiver 820, and a memory 830, where the processor 810, the transceiver 820, and the memory 830 are connected by using a bus system, the memory 830 is configured to store an instruction, and the processor 810 is configured to execute the instruction stored in the memory 830, to control the transceiver 820 to receive or send a signal.

The transceiver 820 is specifically configured to: receive indication information sent by a network device, where the indication information is used to indicate a first HARQ timing corresponding to a first service of the terminal device in a plurality of hybrid automatic repeat request HARQ timings; and receive or send, based on the first HARQ timing, HARQ feedback information corresponding to the first service.

Optionally, before the transceiver 820 is configured to receive the indication information sent by the network device, the transceiver 820 is further configured to receive information that is about a mapping relationship between a HARQ timing and a resource and that is sent by the network device, where the mapping relationship information includes the plurality of HARQ timings and a resource corresponding to each of the plurality of HARQ timings.

It should be understood that the terminal device 800 in this embodiment of the present invention may be corresponding to the terminal device in the method embodiment of the present invention, or may be corresponding to an operation and/or a function of each module in the terminal device 700. For brevity, details are not described herein again.

Figure 9:
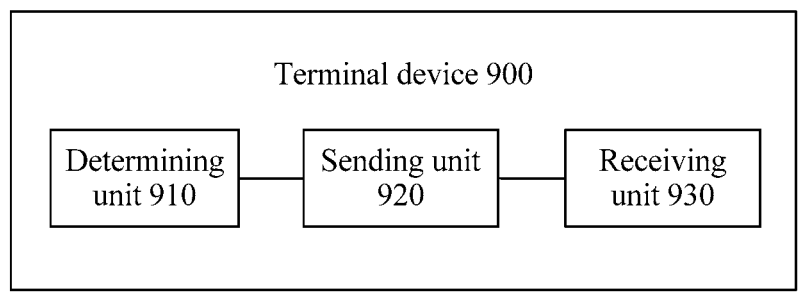
FIG. 9 is a schematic block diagram of a terminal device according to an embodiment of the present invention.

FIG. 9 is a schematic block diagram of a terminal device 900 according to another embodiment of the present invention. As shown in FIG. 9, the terminal device 900 includes:

a determining unit 910, configured to determine, from a plurality of uplink grant UL_grant timings, a first UL_grant timing corresponding to a first uplink service of the terminal device; and a sending unit 920, configured to send first indication information to a network device, where the first indication information is used to indicate the first UL_grant timing.

Optionally, the sending unit 920 is specifically configured to:

send a first uplink scheduling request SR corresponding to the first uplink service and/or first buffer status information BSR corresponding to the first uplink service to the network device, where a type of the first SR and/or a type of the first BSR are/is used to indicate the first UL_grant timing, or an air interface resource location that carries the first SR and/or the first BSR is used to indicate the first UL_grant timing.

Optionally, the terminal device further includes:

a receiving unit 930, configured to receive second indication information sent by the network device, where the second indication information is used to indicate a first transmission timing corresponding to the first uplink service in a plurality of transmission timings.

The sending unit 920 is further configured to:

send the first uplink service to the network device based on the first transmission timing.

Optionally, the receiving unit 930 is specifically configured to:

receive first downlink control information DCI sent by the network device, where the first DCI includes first UL_grant information, and format information of the first DCI is used to indicate the first transmission timing, or a specific information bit in the first DCI is used to indicate the first transmission timing, or an air interface resource location that carries the first DCI is used to indicate the first transmission timing, or a first radio network temporary identifier RNTI for scrambling the first DCI is used to indicate the first transmission timing.

It should be understood that, the terminal device 900 in this embodiment of the present invention may be corresponding to the terminal device in the method embodiment of the present invention, and operations and/or functions of each module in the terminal device 900 and other modules are separately used to implement the corresponding procedures of the method 300. For brevity, details are not described herein again.

Figure 10:
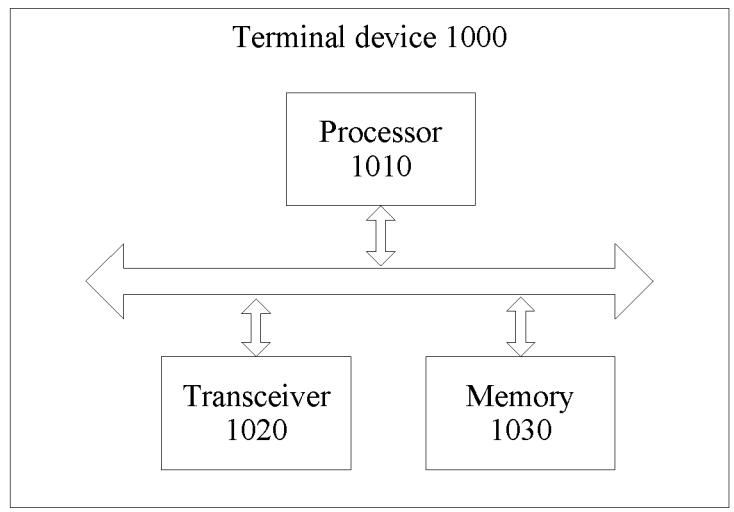
FIG. 10 is a schematic block diagram of a terminal device according to an embodiment of the present invention.

FIG. 10 is a schematic block diagram of a terminal device 1000 according to another embodiment of the present invention. As shown in FIG. 10, the terminal device 1000 includes:

a processor 1010, a transceiver 1020, and a memory 1030, where the processor 1010, the transceiver 1020, and the memory 1030 are connected by using a bus system, the memory 1030 is configured to store an instruction, and the processor 1010 is configured to execute the instruction stored in the memory 1030, to control the transceiver 1020 to receive or send a signal.

The processor 1010 is specifically configured to determine, from a plurality of uplink grant UL_grant timings, a first UL_grant timing corresponding to a first uplink service of the terminal device.

The transceiver 1020 is specifically configured to send first indication information to a network device, where the first indication information is used to indicate the first UL_grant timing.

Optionally, the transceiver 1020 is further configured to: receive second indication information sent by the network device, where the second indication information is used to indicate a first transmission timing corresponding to the first uplink service in a plurality of transmission timings; and send the first uplink service to the network device based on the first transmission timing.

It should be understood that the terminal device 1000 in this embodiment of the present invention may be corresponding to the terminal device in the method embodiment of the present invention, or may be corresponding to an operation and/or a function of each module in the terminal device 900. For brevity, details are not described herein again.

Figure 11:
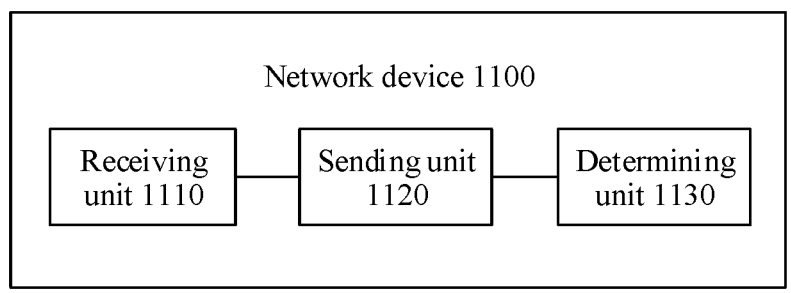
FIG. 11 is a schematic block diagram of a network device according to an embodiment of the present invention.

FIG. 11 is a schematic block diagram of a network device 1100 according to another embodiment of the present invention. As shown in FIG. 11, the network device 1100 includes:

a receiving unit 1110, configured to receive first indication information sent by a terminal device, where the first indication information is used to indicate a first UL_grant timing corresponding to a first uplink service of the terminal device in a plurality of uplink grant UL_grant timings; and a sending unit 1120, configured to send, based on the first UL_grant timing, first UL_grant information corresponding to the first uplink service.

Optionally, the receiving unit 1110 is specifically configured to:

receive a first uplink scheduling request SR corresponding to the first uplink service and/or first buffer status information BSR corresponding to the first uplink service, where the first SR and the first BSR are sent by the terminal device, and a type of the first SR and/or a type of the first BSR are/is used to indicate the first UL_grant timing, or an air interface resource location that carries the first SR and/or the first BSR is used to indicate the first UL_grant timing.

Optionally, the network device 1100 further includes:

a determining unit 1130, configured to determine, from a plurality of transmission timings, a first transmission timing corresponding to the first uplink service.

The sending unit 1120 is further configured to:

send second indication information to the terminal device, where the second indication information is used to indicate the first transmission timing.

Optionally, the sending unit 1120 is specifically configured to:

send first downlink control information DCI to the terminal device, where the first DCI includes first UL_grant information, and format information of the first DCI is used to indicate the first transmission timing, or a specific information bit in the first DCI is used to indicate the first transmission timing, or an air interface resource location that carries the first DCI is used to indicate the first transmission timing, or a first radio network temporary identifier RNTI for scrambling the first DCI is used to indicate the first transmission timing.

It should be understood that, the network device 1100 in this embodiment of the present invention may be corresponding to the network device in the method embodiment of the present invention, and operations and/or functions of each module in the network device 1100 and other modules are separately used to implement the corresponding procedures of the method 300. For brevity, details are not described herein again.

Figure 12:
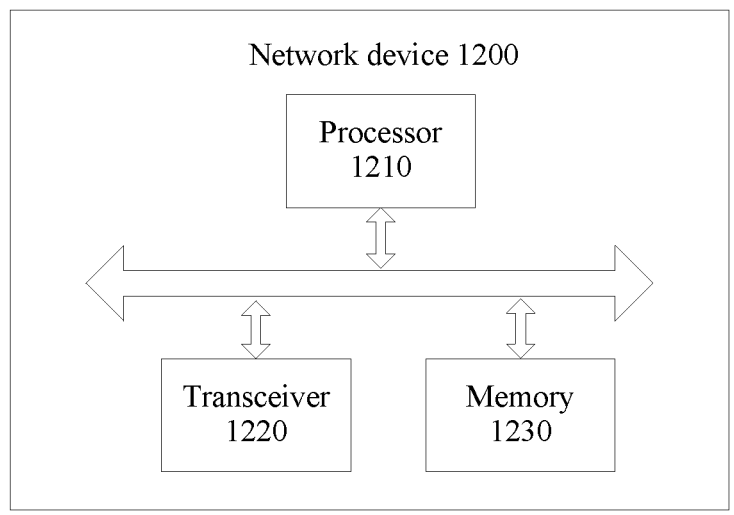
FIG. 12 is a schematic block diagram of a network device according to an embodiment of the present invention.

FIG. 12 is a schematic block diagram of a network device 1200 according to another embodiment of the present invention. As shown in FIG. 12, the network device 1200 includes:

a processor 1210, a transceiver 1220, and a memory 1230, where the processor 1210, the transceiver 1220, and the memory 1230 are connected by using a bus system, the memory 1230 is configured to store an instruction, and the processor 1210 is configured to execute the instruction stored in the memory 1230, to control the transceiver 1220 to receive or send a signal.

The transceiver 1220 is configured to: receive first indication information sent by a terminal device, where the first indication information is used to indicate a first UL_grant timing corresponding to a first uplink service of the terminal device in a plurality of uplink grant UL_grant timings; and send, based on the first UL_grant timing, first UL_grant information corresponding to the first uplink service.

Optionally, the processor 1210 is configured to determine, from a plurality of transmission timings, a first transmission timing corresponding to the first uplink service.

Optionally, the transceiver 1220 is configured to send second indication information to the terminal device, where the second indication information is used to indicate the first transmission timing.

It should be understood that the network device 1200 in this embodiment of the present invention may be corresponding to the network device in the method embodiment of the present invention, or may be corresponding to an operation and/or a function of each module in the network device 1100. For brevity, details are not described herein again.

A person of ordinary skill in the art may be aware that, in combination with the methods described in the embodiments disclosed in this specification, method steps and units may be implemented by electronic hardware, computer software, or a combination thereof. To clearly describe the interchangeability between the hardware and the software, the foregoing has generally described steps and compositions of the embodiments based on functions. Whether the functions are performed by hardware or software depends on particular applications and design constraints of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments of the present invention.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method, wherein the method comprises:
    sending, by a network device, information about a mapping relationship between a hybrid automatic repeat request (HARQ) timing and a resource to a terminal device, wherein the mapping relationship information comprises a plurality of HARQ timings and a resource corresponding to each of the plurality of HARQ timings;
    determining, by the network device and from the plurality of HARQ timings, a first HARQ timing corresponding to a first service of the terminal device; and
    sending, by the network device, indication information to the terminal device, wherein the indication information is used to indicate the first HARQ timing;
    wherein the sending, by the network device, indication information to the terminal device comprises:
        sending, by the network device, first downlink control information (DCI) corresponding to the first service to the terminal device, wherein the first HARQ timing is indicated by using at least one of the following: a type of the first DCI, a specific information bit in the first DCI, an air interface resource location that carries the first DCI, or a first radio network temporary identifier (RNTI) for scrambling the first DCI.

2. The method according to claim 1, wherein the first HARQ timing is a first downlink HARQ timing, and wherein the method further comprises:
    determining, by the network device and based on the first downlink HARQ timing and the mapping relationship information, a first resource corresponding to the first downlink HARQ timing; and
    receiving, by the network device and on the first resource based on the first downlink HARQ timing, first downlink HARQ feedback information that is sent by the terminal device and that is corresponding to the first service.

3. The method according to claim 1, wherein the first HARQ timing is a first uplink HARQ timing, and wherein the method further comprises:
    determining, by the network device and based on the first uplink HARQ timing and the mapping relationship information, a first resource corresponding to the first uplink HARQ timing; and
    sending, by the network device and on the first resource based on the first uplink HARQ timing, first uplink HARQ feedback information corresponding to the first service to the terminal device.

4. The method according to claim 2, wherein the first resource comprises at least one of a resource block (RB) location, a quantity of RBs, code word information, or a sequence number.

5. The method according to claim 3, wherein the first resource comprises at least one of a resource block (RB) location, a quantity of RBs, code word information, or a sequence number.

6. The method according to claim 1, wherein the mapping relationship information comprises at least one of the following correspondences:
    a plurality of downlink HARQ timings and a physical uplink control channel (PUCCH) resource corresponding to each of the plurality of downlink HARQ timings;
    a plurality of downlink HARQ timings and a physical uplink shared channel (PUSCH) resource corresponding to each of the plurality of downlink HARQ timings; or
    a plurality of uplink HARQ timings and a physical hybrid automatic repeat request indicator channel (PHICH) resource corresponding to each of the plurality of uplink HARQ timings.

7. An information transmission method, wherein the method comprises:
    receiving, by a terminal device, information that is about a mapping relationship between a hybrid automatic repeat request (HARQ) timing and a resource and that is sent by a network device, wherein the mapping relationship comprises a plurality of HARQ timings and a resource corresponding to each of the plurality of HARQ timings;
    receiving, by the terminal device, indication information sent by the network device, wherein the indication information is used to indicate a first HARQ timing corresponding to a first service of the terminal device in the plurality of HARQ timings; and
    receiving or sending, by the terminal device and based on the first HARQ timing, HARQ feedback information corresponding to the first service;
    wherein the receiving, by a terminal device, indication information sent by a network device comprises:

receiving, by the terminal device, first downlink control information (DCI) that is sent by the network device and that is corresponding to the first service, wherein the first HARQ timing is indicated by using at least one of the following: a type of the first DCI; a specific information bit in the first DCI; an air interface resource location that carries the first DCI; or a first radio network temporary identifier (RNTI) for scrambling the first DCI.

8. The method according to claim 7, wherein the mapping relationship comprises the following correspondences:
a plurality of downlink HARQ timings and a physical uplink control channel (PUCCH) resource corresponding to each of the plurality of downlink HARQ timings;
a plurality of downlink HARQ timings and a physical uplink shared channel (PUSCH) resource corresponding to each of the plurality of downlink HARQ timings; or
a plurality of uplink HARQ timings and a physical hybrid automatic repeat request indicator channel (PHICH) resource corresponding to each of the plurality of uplink HARQ timings.

9. A network device, comprising:
at least one processor; and
a non-transitory computer-readable storage medium coupled to the at least one processor and storing programming instructions for execution by the at least one processor, wherein the programming instructions instruct the at least one processor to:
send information about a mapping relationship between a hybrid automatic repeat request (HARQ) timing and a resource to a terminal device, wherein the mapping relationship comprises a plurality of HARQ timings and a resource corresponding to each of the plurality of HARQ timings;
determine, from the plurality of HARQ timings, a first HARQ timing corresponding to a first service of the terminal device; and
send indication information to the terminal device, wherein the indication information is used to indicate the first HARQ timing;
wherein the programming instructions instruct the at least one processor to:
send first downlink control information (DCI) corresponding to the first service to the terminal device, wherein the first HARQ timing is indicated by using at least one of the following: a type of the first DCI, a specific information bit in the first DCI, an air interface resource location that carries the first DCI, or a first radio network temporary identifier (RNTI) for scrambling the first DCI.

10. The network device according to claim 9, wherein the first HARQ timing is a first downlink HARQ timing, and wherein the programming instructions instruct the at least one processor to:
determine, based on the first downlink HARQ timing and the mapping relationship information, a first resource corresponding to the first downlink HARQ timing; and
receive, on the first resource based on the first downlink HARQ timing, first downlink HARQ feedback information that is sent by the terminal device and that is corresponding to the first service.

11. The network device according to claim 9, wherein the first HARQ timing is a first uplink HARQ timing, and wherein the programming instructions instruct the at least one processor to:

determine, based on the first uplink HARQ timing and the mapping relationship information, a first resource corresponding to the first uplink HARQ timing; and
send, on the first resource based on the first uplink HARQ timing, first uplink HARQ feedback information corresponding to the first service to the terminal device.

12. The network device according to claim 10, wherein the first resource comprises at least one of a resource block (RB) location, a quantity of RBs, code word information, or a sequence number.

13. The network device according to claim 11, wherein the first resource comprises at least one of a resource block (RB) location, a quantity of RBs, code word information, or a sequence number.

14. The network device according to claim 9, wherein the mapping relationship comprises at least one of the following correspondences:
a plurality of downlink HARQ timings and a physical uplink control channel (PUCCH) resource corresponding to each of the plurality of downlink HARQ timings;
a plurality of downlink HARQ timings and a physical uplink shared channel (PUSCH) resource corresponding to each of the plurality of downlink HARQ timings; or
a plurality of uplink HARQ timings and a physical hybrid automatic repeat request indicator channel (PHICH) resource corresponding to each of the plurality of uplink HARQ timings.

15. A terminal device, comprising:
at least one processor; and
a non-transitory computer-readable storage medium coupled to the at least one processor and storing programming instructions for execution by the at least one processor, wherein the programming instructions instruct the at least one processor to:
receive information that is about a mapping relationship between a hybrid automatic repeat request (HARQ) timing and a resource and that is sent by a network device, wherein the mapping relationship comprises a plurality of HARQ timings and a resource corresponding to each of the plurality of HARQ timings;
receive indication information sent by the network device, wherein the indication information is used to indicate a first HARQ timing corresponding to a first service of the terminal device in a plurality of HARQ timings; and
receive or send based on the first HARQ timing, HARQ feedback information corresponding to the first service;
wherein the programming instructions instruct the at least one processor to:
receive first downlink control information (DCI) that is sent by the network device and that is corresponding to the first service, wherein the first HARQ timing is indicated by at least one of the following: a type of the first DCI; a specific information bit in the first DCI;
an air interface resource location that carries the first DCI; or a first radio network temporary identifier (RNTI) for scrambling the first DCI.

16. The terminal device according to claim 15, wherein the mapping relationship comprises the following correspondences:
a plurality of downlink HARQ timings and a physical uplink control channel (PUCCH) resource corresponding to each of the plurality of downlink HARQ timings;

a plurality of downlink HARQ timings and a physical uplink shared channel (PUSCH) resource corresponding to each of the plurality of downlink HARQ timings; or a plurality of uplink HARQ timings and a physical hybrid automatic repeat request indicator channel (PHICH) resource corresponding to each of the plurality of uplink HARQ timings.

* * * * *